United States Patent [19]

Seem et al.

[11] Patent Number: 5,506,768
[45] Date of Patent: *Apr. 9, 1996

[54] PATTERN RECOGNITION ADAPTIVE CONTROLLER AND METHOD USED IN HVAC CONTROL

[75] Inventors: John E. Seem, Shorewood; Howard J. Haugstad, Milwaukee, both of Wis.

[73] Assignee: Johnson Service Company, Milwaukee, Wis.

[*] Notice: The term of this patent shall not extend beyond the expiration date of Pat. No. 5,355,305.

[21] Appl. No.: 291,283

[22] Filed: Aug. 16, 1994

Related U.S. Application Data

[63] Continuation-in-part of Ser. No. 968,583, Oct. 29, 1992, Pat. No. 5,355,305.

[51] Int. Cl.$^6$ .................................................. G05B 13/02
[52] U.S. Cl. ........................... 364/161; 364/153; 364/157
[58] Field of Search ..................................... 364/152, 153, 364/157, 161, 178, 572, 167.01, 574

[56] References Cited

U.S. PATENT DOCUMENTS

| | | | |
|---|---|---|---|
| Re. 33,267 | 7/1990 | Kraus | 364/158 |
| 5,355,305 | 10/1994 | Seem et al. | 364/161 |

OTHER PUBLICATIONS

R. W. Haines, "HVAC Systems Design Handbook", TAB Professional and Reference Books, Blue Ridge Summit, PA (1988) pp. 170–177.

D. E. Seborg, T. F. Edgar, & D. A. Mellichamp, "Process Dynamics and Control", John Wiley & Sons, NY (1989) pp. 294–307, 538–541.

A. B. Corripio, "Tuning of Industrial Control Systems", Instrument Society of America, Research Triangle Park, NC (1990) pp. 65–81.

K. J. Astrom, T. Hagglund, "Automatic Tuning of PID Controllers", Instrument Society of America, Research Triangle Park, NC (1988) pp. 105–132.

C. J. Harris & S. A. Billings, "Self–Tuning and Adaptive Control: Theory and Applications", Peter Peregrinus LTD (1981) pp. 20–33.

K. J. Astrom and B. Wittenmark, "Adaptive Control", Addison–Wesley Publishing Company (1989) pp. 105–215.

T. W. Kraus 7 T. J. Myron, "Self–Tuning PID Controller Uses Pattern Recognition Approach", Control Engineering, pp. 106–111, Jun. 1984.

E. H. Bristol & T. W. Kraus, "Life with Pattern Adaptation", Proceedings 1984 American Control Conference, pp. 888–892, San Diego, CA (1984).

C. Rohrer & Clay Nesler, "Self–Tuning Using a Pattern Recognition Approach", Johnson Controls, Inc., Research Brief 228 (Jun. 13, 1986).

Francis Schied, "Shaum's Outline Series–Theory & Problems of Numerical Analysis", McGraw–Hill Book Co., NY (1968) pp. 236, 237, 243, 244, 261.

S. M. Pandit & S. M. Wu, "Timer Series & System Analysis with Applications", John Wiley & Sons, Inc., NY (1983) pp. 200–205.

*Primary Examiner*—Roy N. Envall, Jr.
*Assistant Examiner*—Steven R. Garland
*Attorney, Agent, or Firm*—Harness, Dickey & Pierce

[57] ABSTRACT

A pattern recognition adaptive controller configured to dynamically adjust proportional gain and integral time control parameters to minimize integrated absolute errors between a setpoint temperature and a monitored temperature in an HVAC system. The pattern recognition adaptive controller receives a sampled signal representative of the temperature and determines a smoothed signal based on the sampled signal. The controller characterizes a disturbance in the smoothed signal by a damping factor and a closed loop response time. When a significant load disturbance or setpoint temperature change occurs, the controller estimates an optimal gain based on the damping factor, and an optimal integral time based on the response time. The estimated optimal gain and estimated optimal integral time are used to determining a new gain and a new integral time values, to which the control parameters of the controller are then set.

22 Claims, 4 Drawing Sheets

PATTERN RECOGNITION ADAPTIVE CONTROLLER AND METHOD USED IN HVAC CONTROL

This application is a continuation-in-part of U.S. patent application Ser. No. 07/968,583, filed Oct. 29, 1992, now U.S. Pat. No. 5,355,305, entitled "Pattern Recognition Adaptive Controller".

FIELD OF INVENTION

This invention relates to an apparatus and method for adjusting the gain and integral time parameters of a proportional-integral controller used in HVAC, and more specifically to an apparatus and method for adjusting the gain and integral time parameters of a proportional-integral controller in response to patterns in a feedback signal representative of the temperature of air discharged by an HVAC system to control the position of an actuator such as a valve or damper in the HVAC system.

BACKGROUND OF INVENTION

Single-loop feedback controllers ("controllers") are commonly employed in many processes, including maintaining temperature, humidity, pressure, and flow rates for heating, ventilating, and air-conditioning equipment. For example, in an air conditioning system, a controller may be used to control the flow of chilled water through a cooling coil. In such a system, the controller adjusts the water flow rate based on a feedback signal indicative of the temperature of the air discharged from the coil (the "controlled variable"). The feedback signal is generated by a sensor disposed to monitor the controlled variable.

The object of such controllers is to control the system in such a way as to maintain the controlled variable, as sensed by the feedback signal, at a desired level (the "setpoint"). For example, the controller of an air conditioning system attempts to maintain the temperature of the air discharged from the system at a specific level. When the actual temperature of the discharged air deviates from the desired temperature, the controller must appropriately adjust the flow of the chilled water to bring the actual air temperature back in line with the desired air temperature. Thus, if the feedback signal indicates that the actual air temperature is colder than the desired temperature, the controller will cause the flow rate of chilled water to decrease, which will cause the actual temperature of the discharged air to increase. Likewise, if the feedback signal indicates that the actual air temperature is warmer than the desired temperature, the controller will cause the flow rate of chilled water to increase, which will cause the actual temperature of the discharged air to decrease.

Similarly, a cruise controller attempts to maintain a constant speed. When the actual speed varies from the desired speed the controller must adjust the accelerator to bring the actual speed back in line with the desired speed.

An ideal feedback control system would be able to maintain the controlled variable at the setpoint based only on the feedback signal. However, actual feedback control systems require additional inputs known as control parameters. Control parameters are values used by a controller to determine how to control a system based on the feedback signal and the setpoint.

One method for controlling a closed loop system, known as proportional plus integral control (PI), is described in R. W. Haines, *HVAC Systems Design Handbook*, TAB Professional and Reference Books, Blue Ridge Summit, Pa. (1988). A PI controller requires two control parameters: the proportional gain and the integral time.

As these control parameters directly affect the performance and stability of a PI controller, it is important to determine the appropriate values of these parameters. However, the appropriate values for these parameters may change over time as the system is used. For example, the dynamics of a process may be altered by heat exchanger fouling, inherent nonlinear behavior, ambient variations, flow rate changes, large and frequent disturbances, and unusual operations status, such as failures, startup and shutdown. The process of adjusting the control parameters of a controller to compensate for such system changes is called retuning. If a controller is not retuned, the control response may be poor. For example, the controlled variable may become unstable or oscillate widely with respect to the setpoint. Thus, to insure adequate performance, controllers must be periodically retuned with new control parameter values.

The various tuning methods which have been developed to determine the appropriate values of the control parameters for PI controllers fall into three general categories. These categories are: manual tuning, auto-tuning, and adaptive control.

Manual tuning methods require an operator to run different test or trial and error procedures to determine the appropriate control parameters. Some manual tuning methods are described in D. E. Seborg, T. F. Edgar, and D. A. Mellichamp, *Process Dynamics and Control*, John Wiley & Sons, New York (1989) and A. B. Corripio, *Tuning of Industrial Control Systems*, Instrument Society of America, Research Triangle Park, N.C. (1990). Manual tuning methods have the obvious disadvantage of requiring large amounts of operator time and expertise.

Auto-tuning methods require an operator to periodically initiate tuning procedures, during which the controller will automatically determine the appropriate control parameters. The control parameters thus set will remain unchanged until the next tuning procedure. Some auto-tuning procedures are described in K. J. Aström and T. Hägglund, *Automatic Tuning of PID Controllers*, Instrument Society of America, Research Triangle Park, N.C. (1988). While auto-tuning requires less operator time than manual tuning methods, it still requires operator intervention. Further, during the interval between tunings, the controller may become severely out of tune and operate poorly.

With adaptive control methods, the control parameters are automatically adjusted during normal operation to adapt to changes in process dynamics. Thus, no operator intervention is required. Further, the control parameters are continuously updated to prevent the degraded performance which may occur between the tunings of the other methods.

Numerous adaptive control methods have been developed. See, for example, C. J. Harris and S. A. Billings, *Self-Tuning and Adaptive Control: Theory and Applications*, Peter Peregrinus LTD (1981). There are three main approaches to adaptive control: model reference adaptive control ("MRAC"), self-tuning control, and pattern recognition adaptive control ("PRAC"). The first two approaches, MRAC and self-tuning, rely on system models which are generally quite complex. The complexity of the models is necessitated by the need to anticipate unusual or abnormal operating conditions. Specifically, MRAC involves adjusting the control parameters until the response of the system to a command signal follows the response of a reference model. Self-tuning control involves determining the parameters of a process model on-line and adjusting the control parameters based upon the parameters of the process model. Methods for performing MRAC and self-tuning control are described in K. J. Astroöm and B. Wittenmark, Adaptive Control, Addison-Wesley Publishing Company (1989).

With PRAC, parameters that characterize the pattern of the closed-loop response are determined after significant setpoint changes or load disturbances. The control parameters are then adjusted based upon the characteristic parameters of the closed-loop response.

A pattern recognition adaptive controller known as EXACT is described by T. W. Kraus and T. J. Myron, "Self-Tuning PID Controller uses Pattern Recognition Approach," Control Engineering, pp. 106–111, June 1984, E. H. Bristol and T. W. Kraus, "Life with Pattern Adaptation, *Proceedings* 1984 *American Control Conference*, pp. 888–892, San Diego, Calif. (1984), and K. J. Aström and T. Hägglund, *Automatic Tuning of PID Controllers*, Instrument Society of America, Research Triangle Park, N.C. (1988). The EXACT controller is also alleged to be embodied in U.S. Pat. No. Re. 33,267 issued to T. W. Kraus. The EXACT method, like other adaptive control methods, does not require operator intervention to adjust the control parameters under normal operation. However, before normal operation may begin, EXACT requires a carefully supervised startup and testing period. During this period, an engineer must determine the optimal initial values for controller gain, integral time, and derivative time. The engineer must also determine the anticipated noise band and maximum wait time of the process. The noise band is a value representative of the expected amplitude of noise on the feedback signal. The maximum wait time is the maximum time the EXACT algorithm will wait for a second peak in the feedback signal after detecting a first peak. Further, before an EXACT-based controller is put into normal use, the operator may also specify other parameters, such as the maximum damping factor, the maximum overshoot, the parameter change limit, the derivative factor, and the step size.

In the EXACT method, the value of the parameter change limit, which may be supplied as a predetermined constant or entered by a user, defines a range within which the parameter values of the controller are considered valid. For example, the EXACT method will not set the proportional gain of a controller to a value that exceeds the upper limit of the range defined by the parameter change limit. By specifying a valid parameter range, the EXACT method prevents the controller from using the extreme parameter values that may be a result of hardware or software errors or deficiencies. However, by constraining the parameters to values that fall within a designated range, the EXACT method prevents the use of parameter values outside the range even when such values would provide improved performance.

A second known pattern recognition adaptive controller is described by Chuck Rohrer and Clay G. Nelser in "Self-Tuning Using a Pattern Recognition Approach," Johnson Controls, Inc., Research Brief 228 (Jun. 13, 1986). The Rohrer controller calculates the optimal control parameters based on a damping factor, which in turn is determined by the slopes of the feedback signal. Similar to EXACT, the Rohrer method requires an engineer to enter a variety of initial values before normal operation may commence. Specifically, an operator must specify the initial values for a proportional band, an integral time, a deadband, a tune noise band, a tune change factor, an input filter, and an output filter.

Thus, both EXACT and the Rohrer controller require an operator to enter numerous control parameters before normal operation may begin. The more numerous the operator selected control parameters, the more difficult it is to adjust a pattern recognition adaptive controller for optimal performance, and the longer it takes to prepare a pattern recognition adaptive controller for operation.

As is evident by the foregoing discussion, it is desirable to provide a pattern recognition adaptive controller with fewer operator-specified control variables than are required by the pattern recognition adaptive controllers currently available. It is further desirable to provide a pattern recognition adaptive controller with improved performance, and particularly one which performs in a near-optimal manner under a large amount of noise. It is further desirable to provide a pattern recognition adaptive controller with a variable tune noise band which adjusts automatically to different noise levels in the process. It is also desirable to provide a pattern recognition adaptive controller which efficiently controls a process with a reduced number of actuator adjustments, and therefore reduced energy costs, by decreasing oscillations for the controlled variable signal. It is further desirable to provide a robust pattern recognition adaptive controller that performs relatively secure control without constraining the values of its parameters to a predetermined range. Finally, it is desirable to provide a pattern recognition adaptive controller with reduced resource requirements, and more particularly, which requires less memory and less computational power than previous pattern recognition adaptive controllers.

SUMMARY OF INVENTION

The present invention provides a method of dynamically adjusting the control parameters of a proportional gain and integral time controller disposed to control an actuator in an HVAC system, which includes the steps of sampling a feedback signal representative of the output air temperature of the HVAC system to generate a sampled signal, generating a smoothed signal based on the sampled signal, determining an estimated noise level of the sampled signal, and determining a tune noise band based on the estimated noise level and the smoothed signal. The method further includes the step of adjusting the gain and integral time values used by the controller if either the difference between a previous setpoint temperature and a current setpoint temperature, or the difference between the current setpoint temperature and the smoothed signal, falls outside the tune noise band.

The present invention further provides a pattern recognition adaptive controller disposed to control an actuator in an HVAC system which includes means for receiving a sampled feedback signal representative of the HVAC output air temperature, means for generating a smoothed signal based on the sampled feedback signal, means for determining an estimated noise level of the sampled signal, and means for determining a tune noise band based on the estimated noise level and the smoothed signal. The controller further includes means for determining whether a significant setpoint temperature change has occurred by comparing the tune noise band to the difference between a previous setpoint temperature and a current setpoint temperature, means for determining whether a significant load disturbance has occurred by comparing the tune noise band to the difference between the current setpoint temperature and the smoothed signal, means for determining a damping factor based on the slope of the smoothed signal, and means for determining a closed loop response time based on the height of the smoothed signal. The controller also includes means for determining an average disturbance size, means for estimating an optimal gain based on the damping factor, means for estimating an optimal integral time based on the response time, and means for determining a new gain and a new integral time based on the estimated optimal gain, the estimated optimal integral time, the current gain and integral time values used in the controller, the signal-to-noise ratio of the sampled signal, and the size of the current load disturbance or setpoint change relative to the average disturbance size, and means for setting the gain and integral time of the controller to the new gain and the new integral time.

BRIEF DESCRIPTION OF THE DRAWINGS

The features of the present invention, which are believed to be novel, are set forth with particularity in the appended claims. The invention, together with further objects and advantages thereof, may best be understood by making reference to the following description taken in conjunction with the accompanying drawings wherein:

DETAILED DESCRIPTION

Figure 1:
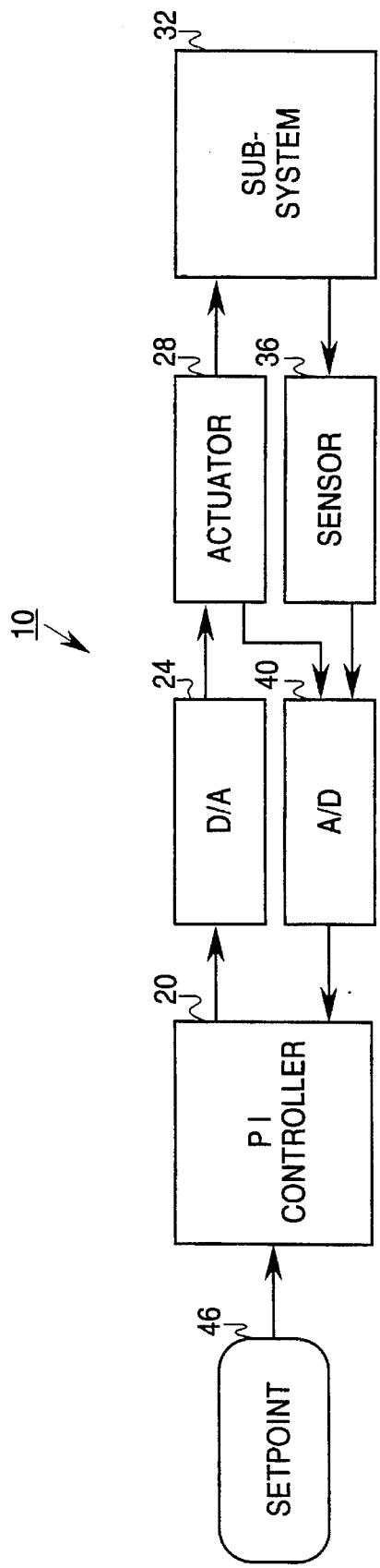
FIG. 1 is a block diagram illustrating the principal components of a closed loop feedback system in accordance with the present invention.

FIG. 1 shows the hardware configuration of a closed-loop PI control system 10 embodying the present invention. System 10 generally includes a PI controller 20, an actuator 28, a subsystem 32 which controls a process, and a sensor 36. Controller 20 is coupled to actuator 28 through a digital to analog converter 24, and to sensor 36 through an analog to digital converter 40.

Actuator 28 is disposed to affect the operation of subsystem 32. For example, subsystem 32 may be an air conditioning subsystem for which actuator 28 controls a valve through which chilled water passes. Sensor 36 is disposed to monitor the controlled variable of subsystem 32, which is affected by actuator 28. Actuator 28 is appropriately chosen for the process being controlled and may be mechanical, hydraulic, electronic or any combination thereof.

In one embodiment control system 10 is for temperature control, sensor 36 may be a thermometer disposed to monitor the temperature of air that is discharged from subsystem 32 which may be an HVAC system. In such an application control system 10 adjusts the position of an actuator, such as a damper or valve, which controls the temperature of the output air of the HVAC system. In another temperature application control system 10 is for controlling the temperature of a chemical or biological process such as in a distillation column or a chemical reactor and sensor 36 may be a thermometer and the boil-up of the distillation column is manipulated.

In a vehicle application control system 10 is for cruise control, sensor 36 may be a velocity sensor (speedometer), and subsystem 32 may be an automobile engine. In another vehicular application control system 10 is for maintaining a vehicle or ship on a desired heading or course steering (autopilot), sensor 36 may be a heading detector (compass), and subsystem 32 the steering system or turning regulator of the ship.

In another alternative embodiment control system 10 is for controlling combustion and sensor 36 measures the oxygen content of a flue gas and the fuel to air ratio is manipulated. In another chemical application control system 10 is for controlling a filtration or ultrafiltration process such as dialysis and sensor 36 may be a flow sensor and the weight loss of the filtration system is manipulated.

In still another alternative embodiment control system 10 is for controlling the level of fluid in a vessel, such as pulp in a pulp mill and sensor 36 is a level detector. In another papermaking application control system 10 is for controlling the rate of drying or moisture content in a process, such as the moisture content in a wet pup sheet and sensor 36 may be a moisture detector and the steam pressure (which effects the drying rate) is manipulated.

In another alternative embodiment control system 10 is for controlling the position of an electromagnetic actuator by varying the voltage to the windings, sensor 36 may be a voltage sensor, and subsystem 32 may be a voltage source.

Whatever the application, sensor 36 transmits a signal representative of the controlled variable (temperature, speed, etc.) to analog to digital converter 40. This controlled variable signal is preferably filtered by an anti-aliasing filter (not shown) to remove high frequency signals. Analog to digital converter 40 samples the filtered controlled variable signal and transmits a sampled feedback signal to controller 20. Controller 20 compares the sampled feedback signal to a setpoint 46, which is representative of the desired value of the controlled variable, to determine the extent to which the controlled variable has diverged from setpoint 46. Such divergences may be caused by setpoint changes or load disturbances. Based on that comparison, controller 20 determines how actuator 28 should respond to cause the controlled variable to return to setpoint 46. Once the appropriate response is determined, controller 20 generates a control signal through digital to analog converter 24 to actuator 28. In response to the control signal, actuator 28 appropriately alters the operation of subsystem 32. During this procedure, the control parameters of controller 20 are retuned to compensate for any changes in the process. Preferably, the new PI values are chosen to minimize the integrated absolute errors between setpoint 46 and the controlled variable.

A crucial factor in the efficiency and performance of system 10 is the accuracy with which controller 20 determines the new PI values after any given disturbance. A pattern recognition adaptive controller implemented in accordance with the present invention makes this determination by characterizing the closed loop response, as the response is reflected in the sampled feedback signal.

According to a preferred embodiment of the present invention, two dimensionless parameters, a damping factor and a response time, are used to characterize the closed loop response. The damping factor is based upon an estimate of the slope of the sampled feedback signal, and the response time is a measurement of the speed of response of subsystem 32. From these two parameters, the optimal gain and integral time of controller 20 are determined. Specifically, the gain of controller 20 is adjusted based upon the estimated damping factor, and the integral time of controller 20 is adjusted based upon the closed loop response time.

Figure 2B:
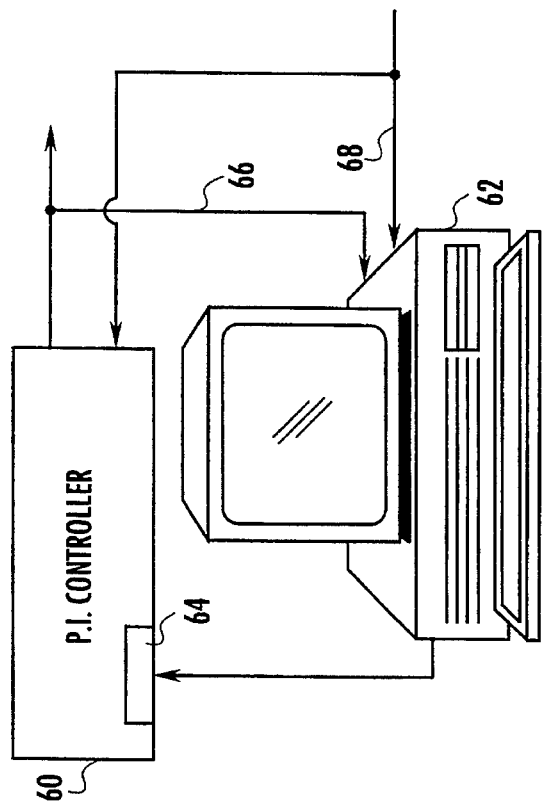
FIG. 2B is a block diagram illustrating a pattern recognition adaptive controller in accordance with an alternative embodiment of the present invention.
Figure 2A:
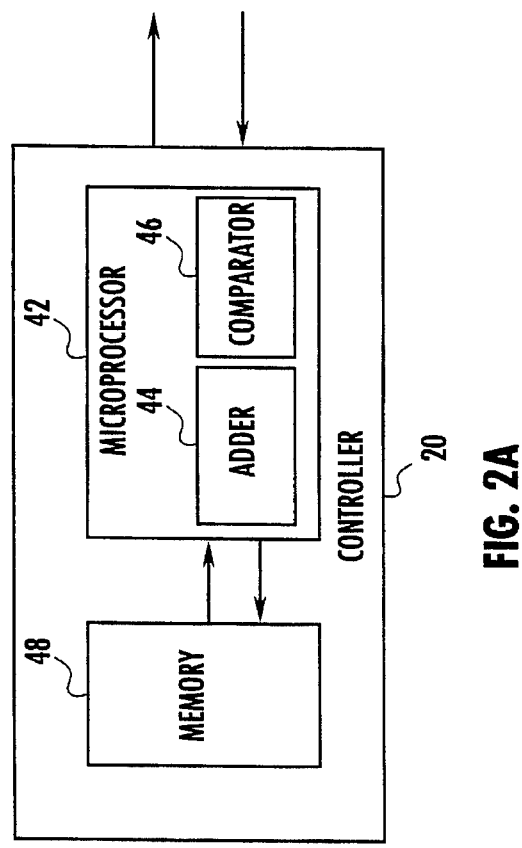
FIG. 2A is a block diagram illustrating a pattern recognition adaptive controller in accordance with the preferred embodiment of the present invention.

FIG. 2A shows pattern recognition adaptive controller 20 according to the preferred embodiment of the present invention. According to this embodiment, controller 20 internally incorporates the hardware and software required to implement the pattern recognition adaptive control process. The hardware may include a microprocessor 42 and memory 48. Microprocessor 42 includes an adder 44 and a comparator 46 and operates according to program instructions stored in memory 48. Memory 48 may be ROM, EPROM, EEPROM, RAM loaded with the appropriate instructions, or any other digital information storage means.

FIG. 2B shows an alternative embodiment of the present invention. According to this embodiment, the process of determining optimal control parameter values is implemented by an external processing unit 62, such as a personal computer. The processing unit 62 is connected to a PI controller 60 through an interface 64, such as a serial port. The processing unit 62 receives the control signal generated by controller 60 via a line 66 and the feedback signal from sensor 36 via a line 68. Based on these signals, processing unit 62 determines the optimal control parameters for controller 60. These parameters are then transmitted to controller 60 through interface 64. External processing unit 62 may be connected to controller 60 to provide continuous parameter retuning, or may be connected thereto from time to time to provide retuning on a periodic basis. When processing unit 62 is not connected to controller 60, the operating parameters of controller 60 remain constant at the values generated by processing unit 62 during the most recent retuning operation. A more detailed description of the preferred embodiment of the present invention will now be made with reference to FIG. 3.

Figure 3:
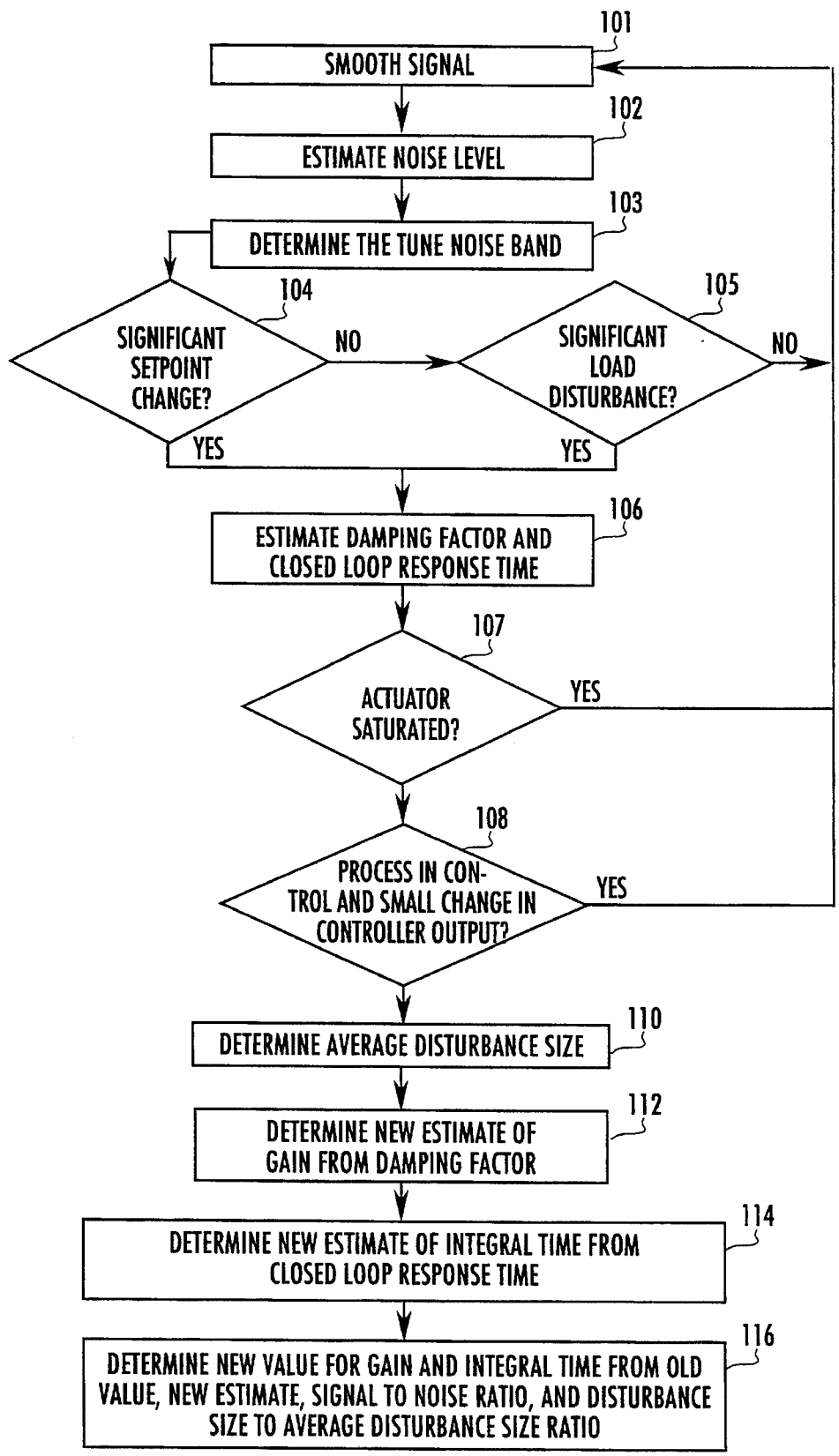
FIG. 3 is a flow diagram illustrating the manner in which the controller of FIG. 1 may be implemented for dynamically adjusting control parameters in accordance with the present invention.

FIG. 3 is a flowchart illustrating the manner in which controller 20 may be implemented for determining the optimal PI values in accordance with a preferred embodiment of the present invention. The implementation generally comprises step 101 for smoothing the sampled feedback signal, step 102 for estimating a noise level, step 103 for determining a tune noise band, step 104 for determining if a significant setpoint change has occurred, and step 105 for determining if a significant load disturbance has occurred. The implementation further comprises step 106 for estimating a damping factor and closed loop response time, step 107 for determining if actuator 28 is saturated, step 108 for determining whether there is a small change in the controller output and the process is in control, step 110 for determining an average disturbance size, step 112 for determining an estimated gain, step 114 for determining an estimated integral time, and step 116 for determining a new gain and a new integral time. A more detailed description of these steps will now be given.

In step 101, a smoothed signal is estimated from the sampled feedback signal. The smoothed signal is based upon fitting a quadratic function through five evenly spaced points. Smoothing techniques are also used to estimate the slopes of the sampled feedback signal. The estimated slope of the sampled feedback signal ("estimated slope") is based upon fitting a quadratic function through seven evenly spaced points.

Specifically, a smoothed signal is determined according to the method for smoothing a discrete set of noisy data described in Francis Schied, *Shaum's Outline Series— Theory and Problems of Numerical Analysis*, McGraw-Hill Book Company, New York (1968). This method is based upon minimizing the sum of square of errors to a polynomial approximation. For example, Equation 1 is used to minimize the sum of squares for a quadratic function for five evenly spaced points, where $\tilde{y}_t$ is the smoothed signal value at time t, $y_t$ is the actual value of the sampled feedback signal at time t, $y_{t+jT}$ is the actual value of the sampled feedback signal at time t+jT, and T is the time between samples ("time step").

$$\tilde{y}_t = \frac{1}{70}(-6y_{t-2T} + 24y_{t-T} + 34y_t + 24y_{t+T} - 6y_{t+2T}) \tag{1}$$

Unlike many other noise-compensation techniques, such as low-pass filtering, smoothing techniques do not change the patterns of a closed loop response, and therefore do not require a tradeoff between changing the shape of the signal and removing noise. Equation 2 is used to estimate the slope of the sampled feedback signal at time t based upon seven evenly spaced points.

$$\frac{dy_t}{dt} = \frac{1}{28T}(-3y_{t-3T} - 2y_{t-2T} - y_{t-T} + y_{t+T} + 2y_{t+2T} + 3y_{t+3T}) \tag{2}$$

When determining the slopes, it is important to determine the time that the sampled feedback signal reaches an extremum, and the value of the extremum. An extremum is a point where a signal reverses direction. Thus, a local extremum exists at the points where the slope of the sampled feedback signal changes sign. A simple procedure for determining local extremum is to compute the product of the current estimate of the slope and the previous estimate of the slope. When this product is negative, then a local extremum exists. Further, because of the limited resolution of A/D converters, an extremum may also be characterized by the transition from a non-zero slope to a slope of zero. When such is the case, the zero slope is indicative of a change in direction that was too small, relative to the resolution of the A/D converter, to be distinguished from a constant signal.

Figure 4:
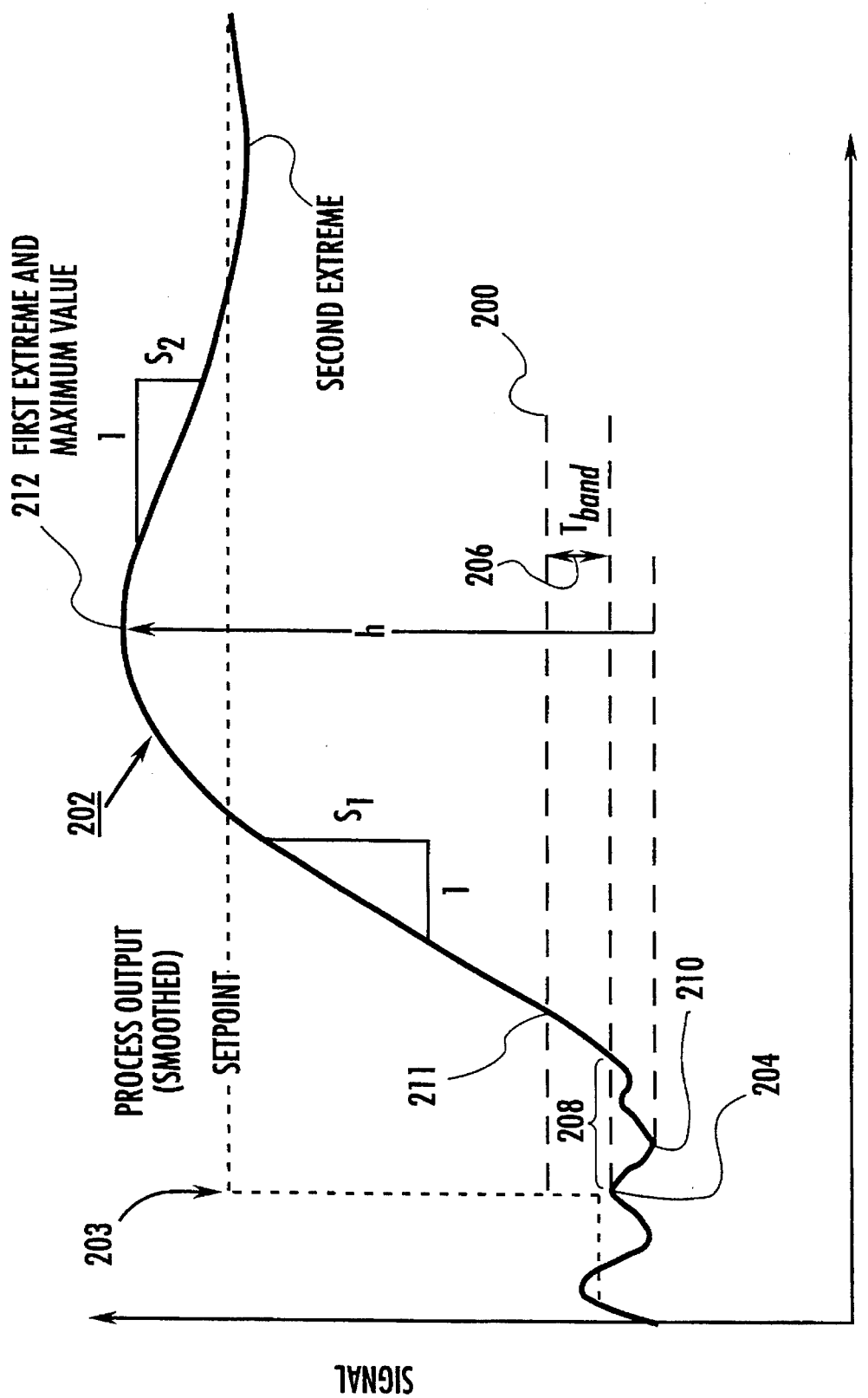
FIG. 4 is a graph illustrating the timing for determining extremums in a smoothed signal after a positive setpoint change.

To correctly characterize a closed loop response, it is necessary to search for the slopes and extremums of the smoothed signal at the proper time. The time to begin the search for slopes and extremums is different for load disturbances and setpoint changes. The process of determining the values necessary to determine the relevant slopes of the smoothed signal will now be described in detail with reference to FIG. 4.

For setpoint changes, the search for the minimum and maximum values (210 and 212, respectively) of a smoothed signal 202 begins immediately after a setpoint change 203 has occurred. In contrast, the search for extremums and slopes begins when the smoothed signal 202 falls outside a tune noise range ("$T_{range}$") determined by the magnitude of the smoothed signal 202 at the time of the setpoint change 204 and the tune noise band ("$T_{band}$"). Specifically, for positive setpoint changes, the search for extremums and slopes begins when the smoothed signal 202 exceeds an upper limit 200. In the illustrated example, the smoothed signal 202 exceeds the upper limit 200 at a point 211. The upper limit 200 is equal to the smoothed signal 202 at the time of the setpoint change 204 plus the tune noise band 206. For negative setpoint changes, the search for extremums and slopes begins when the smoothed signal 202 falls below a lower limit (not shown) defined by the smoothed signal 202 at the time of the setpoint change 204 minus the tune noise band 206. The search for extremums is thus delayed to prevent the inaccurate characterization of a closed loop response based on any small oscillations 208 in the smoothed signal 202 which may occur following the setpoint change 203. The determination of a tune noise band will be discussed in greater detail below.

For significant load disturbances, the search for a first extremum and the minimum and maximum values begins immediately after a significant load disturbance has been identified. A significant load disturbance occurs when the smoothed signal exceeds the upper tune noise limit for two consecutive samples, or falls below the lower tune noise limit for two consecutive samples. After the first extremum is located, the search begins for the minimum and maximum slopes, and for second and third extremums.

If there is a high level of noise in the sampled feedback signal, there will be large differences between the sampled feedback signal and the smoothed signal determined in step 101. The difference between the sampled feedback signal and the smoothed signal is a measure of the noise level. During step 102, an exponentially weighted moving average, as described in S. M. Pandit and S. M. Wu, *Timer Series and System Analysis with Applications*, John Wiley & Sons, Inc., New York (1983), is used to determine a long-term average of the noise level ("estimated noise level") of the sampled feedback signal. The exponentially weighted moving average is a digital version of an exponential filter, as described in D. E. Seborg, T. F. Edgar, and D. A. Mellichamp, *Process Dynamics and Control*, John Wiley & Sons, New York (1989).

Specifically, an exponentially weighted moving average is determined according to Equation 3, where $\bar{n}_r$ is the estimate of noise for sample r, r is the running index of the number of samples used in the noise estimate, $\bar{n}_{r-1}$ is the estimate of noise for sample r−1, $\lambda$ is an exponential smoothing constant, $\tilde{y}_r$ is the estimate of the signal for sample r based upon a 5 point quadratic, and $Y_r$ is the actual value of the signal for sample r.

$$\bar{n}_r = \bar{n}_{r-1} + \lambda(|\tilde{y}_r - y_r| - \bar{n}_{r-1}) \tag{3}$$

The value for the exponential smoothing constant is typically between 0.0 and 0.3, and, in accordance with one embodiment of the present invention, is chosen to be 0.001 to correspond to a time constant for a first order system of approximately 1000 sampling intervals. The initial value of the weighted moving average is determined by the first $1/\lambda$ samples according to Equation 4.

$$\bar{n}_r = \bar{n}_{r-1} + \frac{1}{r}(|\tilde{y}_r - y_r| - \bar{n}_{r-1}) \tag{4}$$

In step 103, a tune noise band is determined. The tune noise band specifies the minimum size of the error (the difference between the setpoint and the smoothed feedback signal) which must occur before a pattern is identified as a setpoint change or load disturbance.

The tune noise band is determined according to Equation 5, where $T_{band}$ is the tune noise band, $Y_{max}$ is the maximum expected value for the process output, $Y_{min}$ is the minimum expected value for the process output, $R_{min}$ is the minimum resolution of the A/D or D/A converter used in the control system, $\alpha$ is a constant equal to 5.33, and $\bar{n}$ is the average noise level as determined from Equation 3. The first term of Equation 5 is used to prevent adjustment of the controller parameters when there is a small limit cycle due to the error associated with quantization. The second term adjusts the tune noise band when there is a large amount of noise in the controlled variable signal. The resolution of the A/D or D/A converter is equal to $1/(2^{Bits})$, where Bits is the number of bits of resolution for the A/D or D/A converter.

$$T_{band} = \text{maximum}(4(y_{max} - y_{min})R_{min}, \alpha\bar{n}) \tag{5}$$

As is evident by Equation 5, the tune noise band increases as the average noise level increases. The value of 5.33 for the constant $\alpha$ is determined from optimizations that minimized the integrated absolute error for a wide range of systems.

In step 104, it is determined whether a significant setpoint change has occurred. A significant setpoint change is any setpoint change which has a greater magnitude than the tune noise band, as determined in step 103. If a significant setpoint change has occurred, control passes to step 106. Otherwise, control passes to step 105.

In step 105, it is determined whether a significant load disturbance has occurred. Specifically, the difference ("error") between the setpoint and the smoothed signal is compared with the tune noise band. If the absolute value of the error exceeds the tune noise band for two consecutive samples, then a significant load disturbance is considered to have occurred.

If either a significant setpoint change or a significant load disturbance occurs, execution continues to step 106. Otherwise, controller 20 waits for the next feedback signal sample and, when received, begins execution again at step 101. During step 106, a damping factor and a closed loop response time are determined from the smoothed signal and the estimated slope.

Specifically, when the smoothed signal is underdamped, Equation 6 is used to determine a damping factor, unless $S_1$ and $S_2$ cannot be ascertained within a specified time period.

$$d_{slope} = \frac{s_2}{s_1} \tag{6}$$

For setpoint changes, $S_1$ is the maximum of the absolute value of the slope between the time the smoothed signal falls outside the $T_{range}$ and the time of the first extremum, and $S_2$ is the maximum of the absolute value of the slope between the time of the first extremum and the second extremum. For load disturbances, $S_1$ is the maximum of the absolute value of the slope between the time of the first extremum and the second extremum, and $S_2$ is the maximum of the absolute value of the slope between the time of the second extremum and the third extremum. Thus, for significant setpoint changes, the damping factor is determined within two reversals of the controlled variable and for significant load disturbances, the damping factor is determined within three reversals of the controlled variable.

The maximum amount of time for detecting the damping factor and the response time after a significant setpoint change or a significant load disturbance is called the wait time. The optimal amount of wait time depends upon the ratios of sampling interval to the dominant time constant of the process, and the sampling interval to dead time.

An appropriate wait time may be determined using numerical simulations. Equation 7 is used to determine the minimum wait time for a process after a significant setpoint change, where $T_{wait,set}$ set is the wait time, T is the time between samples, and $\tau$ is the time constant of the process.

$$\frac{T_{wait,set}}{T} = 6.83 + 5.34 \frac{\tau}{T} \tag{7}$$

Equation 8 is used to determine the minimum wait time for a process after a significant load disturbance, where $T_{wait, load}$ is the wait time, and $\tau$ is the time constant of the process.

$$\frac{T_{wait,load}}{T} = 7.54 + 6.72 \frac{\tau}{T} \qquad (8)$$

As mentioned above, Equation 6 is used to determine the damping factor when $S_1$ and $S_2$ are determined within the specified wait time and there is some overshoot in the smoothed signal. If the second slope, $S_2$, is not determined within the wait time, then the damping factor is set to zero. Likewise, if there is no overshoot and $h < 2\, T_{band}$, the damping factor is set to zero. Further, if $S_2$ is larger than $S_1$, which indicates an unstable response, the damping factor is set to one.

The closed loop response time ("θ") is determined by Equation 9, where h is the height of the response, $S_1$ is determined as described above, and T is the sampling interval. However, if $S_2$ is larger than $S_1$, then the response time is determined by the equation $\theta = h/(S_{2T})$. Further, if $S_2$ is not determined within the wait time, or if there is no overshoot and $h < 2\, T_{band}$, then θ is not determined.

$$\theta = \frac{h}{s_1 T} \qquad (9)$$

The height of a response, in turn, is calculated by Equation 10 both for setpoint changes and for load disturbances.

$$h = \tilde{Y}_{maximum} - \tilde{Y}_{minimum} \qquad (10)$$

For Equation 10, h represents the height of the response, $\tilde{y}_{maximum}$ is the maximum value of the smoothed signal, and $\tilde{y}_{minimum}$ is the minimum value of the smoothed signal.

For a response with overshoot or for an unstable response following a load disturbance, the height of the response is determined between the time of the disturbance and the third extremum. For a sluggish response, the height of the response is determined between the time of the load disturbance and the time of the load disturbance plus the wait time for load disturbances.

During step 107, it is determined whether actuator 28 has been saturated. An actuator can become saturated after a large disturbance in which the load exceeds the range of the controlled variable. If actuator 28 saturates and the load cannot be met, then the gain and integral time are not updated because controller 20 is doing all it can to move the controlled variable towards setpoint 46. Instead, controller 20 waits for the next feedback signal sample and execution begins again at step 101. If the load can be met and actuator 28 is not saturated, then control passes to step 110.

During step 108, it is determined whether a small change in the controller output has occurred and whether the process is in control. A change is considered small if the controller output moves less than four times the resolution of the D/A converter. The change in process output is determined by subtracting the minimum controller output from the maximum controller output during the time period that the response is being characterized. The process is considered "in control" when any one sample of the smoothed estimate of the process output is between the upper and lower tune noise limits. If the process is in control and the change is small, control passes back to step 101. Otherwise it continues to step 110. This step compensates for possible imprecision in the devices, such as valves, that are being used to control the relevant process. For example, a small change in controller output may result in no change in the output of a valve.

During step 110, an average disturbance size is determined. The average disturbance size is a measure of the average size of a disturbance or setpoint change. An exponentially weighted moving average is used to determine the average disturbance size. The average disturbance size is used to adjust the gain and integral term of controller 20 based upon the size of the most recent disturbance relative to the size of the average disturbance.

The size of a disturbance is determined by Equation 11 where σ is the disturbance size, Maximum is function that determines the largest number in a list, $\tilde{y}_{maximum}$ is maximum value of the smoothed feedback signal, Minimum is function that determines the smallest number in a list, and $\tilde{y}_{minimum}$ is minimum value of the smoothed feedback signal. Setpoint is the current setpoint for a load disturbance, and is the new setpoint in the case of a setpoint change.

$$\sigma = \text{Maximum}(\tilde{y}_{maximum}, \text{Setpoint}) - \text{Minimum}(\tilde{y}_{minimum}, \text{Setpoint}) \qquad (11)$$

Equation 12 is used to estimate an average disturbance size, where $\bar{\sigma}_p$ is the estimate of disturbance size based upon p patterns, p is the running index of the number of patterns characterized, λ is the exponential smoothing constant, $\bar{\sigma}_{p-1}$ is the estimate of disturbance size based upon p−1 patterns, and $\sigma_p$ is σ for disturbance p.

$$\bar{\sigma}_p = \bar{\sigma}_{p-1} + \lambda(\sigma_p - \bar{\sigma}_{p-1}) \qquad (12)$$

For the first 1/λ patterns, Equation 13 is used to determine the average disturbance size.

$$\bar{\sigma}_p = \bar{\sigma}_{p-1} + \frac{1}{p}(\sigma_p - \bar{\sigma}_{p-1}) \qquad (13)$$

In step 112, an estimate for the gain ("estimated gain") is determined from an equation that is a function of the damping factor. The equation provides near optimal performance in terms of minimizing the integrated absolute error and is used for both load disturbances and setpoint changes.

Specifically, the ratio of the estimated gain to the present gain is determined by Equation 14, where $\hat{K}_{opt}$ is the estimated gain, K is the present value of the gain, and constants are supplied according to Table 1.

TABLE 1

$$\frac{\hat{K}_{opt}}{K} = a_0 + a_1 d_{slope} + a_2 d_{slope}^2 \ldots + a_n d_{slope}^n \qquad (14)$$

| n | $a_0$ | $a_1$ | $a_2$ | $a_3$ | $a_4$ | S |
|---|-------|-------|-------|-------|-------|------|
| 1 | 1.163 | −0.829 |       |        |       | 7.43 |
| 2 | 1.230 | −1.525 | 0.804 |        |       | 1.44 |
| 3 | 1.254 | −1.939 | 1.969 | −0.831 |       | 1.03 |
| 4 | 1.264 | −2.199 | 3.347 | −3.204 | 1.272 | .97  |

The coefficient values of Table 1 are derived through linear regression to minimize Equation 15.

$$S = \sum_{j=1}^{2000} \left( \frac{K_{opt,j} - \hat{K}_{opt,j}}{K_j} \right)^2 \qquad (15)$$

Then, the present gain is multiplied by the ratio determined by Equation 14 to yield the estimated gain for a response with a damping factor of 0.15.

In step 114, a new estimate of the integral time ("estimated integral time") is determined from an equation that is a function of the closed loop response time. This equation provides near-optimal performance and is used for both load disturbances and setpoint changes.

Specifically, the ratio of an estimated integral time to the actual sampling interval is determined by Equation 16, where $\hat{T}_{i,opt}$ is the estimate of optimal integral time, T is the sampling interval for controller 20, θ is the closed loop response time, and the constants are supplied according to Table 2.

TABLE 2

$$\frac{\hat{T}_{i,opt}}{T} = b_0 + b_1\theta + b_2\theta^2 \ldots + b_n\theta^n \quad (16)$$

| n | $b_0$ | $b_1$ | $b_2$ | $b_3$ | S |
|---|---|---|---|---|---|
| 1 | −3.429 | 1.285 | | | 2144 |
| 2 | −4.579 | 1.548 | −0.012 | | 2122 |
| 3 | −14.357 | 4.713 | −0.319 | 0.009 | 1908 |

Then, the present sampling interval is multiplied by the ratio determined by Equation 16 to yield the estimated integral time. A lower limit on the estimated integral time is two sampling intervals.

In step 116, new values for gain and integral time ("new gain and new integral time values") are determined. The new gain and new integral time values replace the gain and integral time values that were used by controller 20 before the most recent significant load disturbance or significant setpoint change. The new gain and new integral time values are based on the estimated gain and the estimated integral time determined in steps 112 and 114, respectively, the current values of gain and integral time, the size of the disturbance or setpoint change relative to the level of noise in the sampled feedback signal (the signal-to-noise ratio), and the size of the disturbance or setpoint change for the current pattern relative to the average size of the disturbances or setpoint changes for previous patterns (the disturbance size ratio).

If the signal-to-noise ratio is high and the disturbance size ratio is high, then the new gain and new integral time values are set equal to the estimated gain and estimated integral time. If the signal-to-noise ratio is small, or if the disturbance size ratio is small, then the values for the gain and integral time are not changed. However, the integral time is not updated from the estimate of the closed loop response time when the damping factor is zero.

Specifically, the new gain value is determined by Equation 17, where $K_{new}$ is the new value of gain for PI controller 20, $K_{old}$ is the gain currently being used in controller 20, $\lambda_{dist.-size}$ is an exponential smoothing constant which is a function of the disturbance-size ratio, $\lambda_{signal-noise}$ is an exponential smoothing constant which is a function of an signal-to-noise ratio, and $\hat{K}_{opt}$ is the estimated gain.

$$K_{new} = K_{old} + \lambda_{dist.-size}\lambda_{signal-noise}(\hat{K}_{opt} - K_{old}) \quad (17)$$

The new integral time value is determined by Equation 18, where $T_{i,new}$ is the new value of integral time for controller 20, $T_{i,old}$ is the integral time currently being used in controller 20, and $\hat{T}_{i,opt}$ is the estimated integral time.

$$T_{i,new} = T_{i,old} + \lambda_{dist.-size}\lambda_{signal-noise}(\hat{T}_{i,opt} - T_{i,old}) \quad (18)$$

The exponential smoothing constants, $\lambda_{dist.-size}$ and $\lambda_{signal-noise}$, vary between zero and one. If both smoothing constants are equal to one, then the new values for the gain and integral time are equal to the estimated values. If either one of the smoothing constants is zero, then the gain and integral time are not changed.

Whether the smoothing constants equal zero or one depends on their relationship to predetermined constants, $d_1$ and $d_2$ in the case of the disturbance size ratio, and $k_1$ and $k_2$ in the case of the signal to noise ratio.

If the disturbance-size ratio is less than $d_1$, then $\lambda_{dist.-size}$ is zero. If the disturbance-size ratio is greater than $d_2$, then $\lambda_{dist.-size}$ is one. If the disturbance-size ratio is between $d_1$ and $d_2$, then $\lambda_{dist.-size}$ is determined by Equation 19.

$$\lambda_{dist.-size} = \frac{\frac{h}{\bar{h}} - d_1}{d_2 - d_1} \quad (19)$$

In the presently preferred embodiment of the invention, $d_1$ equals 0.0 and $d_2$ equals 2.19. Further, $\lambda_{dist.-size}$ is set equal to one during the initial disturbances or setpoint changes to improve the convergence properties of the pattern recognition adaptive controller during startup. The first five to nine disturbances are typically considered to be initial disturbances.

Similarly, if the signal-to-noise ratio is less than $k_1$, then $\lambda_{signal-noise}$ is zero, and if the signal-to-noise ratio is greater than $k_2$, then $\lambda_{signal-noise}$ is one. When the signal-to-noise ratio falls between $k_1$ and $k_2$, then Equation 20 is used to determine $\lambda_{signal-noise}$.

$$\lambda_{signal-noise} = \frac{\frac{h}{T_{band}} - k_1}{k_2 - k_1} \quad (20)$$

In the presently preferred embodiment of the invention, $k_1$ equals 0.95 and $k_2$ equals 1.27.

As can been seen from the foregoing, the present invention provides a pattern recognition adaptive controller with fewer operator-specified control variables than are required by the pattern recognition adaptive controllers currently available. Further, the present invention provides a pattern recognition controller with improved performance, and particularly, a controller which controls an actuator in a near-optimal manner under a large amount of signal noise. The present invention also provides a pattern recognition adaptive controller with a variable tune noise band which adjusts automatically to different noise levels in the process. The present invention further provides a pattern recognition adaptive controller which efficiently controls a process with a reduced number of actuator adjustments, and therefore with reduced energy costs.

While a particular embodiment of the present invention has been shown and described, modifications may be made. It is therefore intended in the appended claims to cover all such changes and modifications which fall within the true spirit and scope of the invention.

What is claimed is:

1. A method of dynamically adjusting the control parameters of a proportional gain and integral time controller disposed to control an HVAC actuator, comprising the steps of:

sampling a feedback signal representative of an output air temperature of the HVAC system to generate a sampled signal;

generating a smoothed signal based on the sampled signal;

determining an estimated noise level of the sampled signal;

determining a tune noise band based on the estimated noise level and the smoothed signal;

adjusting the gain and integral time values used by the controller if either the difference between a previous setpoint temperature and a current setpoint temperature, or the difference between the current setpoint temperature and the smoothed signal, falls outside the tune noise band; and utilizing the adjusted control parameters to adjust the position of the actuator.

2. The method of claim 1 wherein the step of generating a smoothed signal includes determining a smoothed sample value based upon fitting a quadratic function through a first plurality of evenly spaced points, and estimating the slope of the sampled signal based upon fitting a quadratic function through a second plurality of evenly spaced points.

3. The method of claim 1 wherein the step of determining an estimated noise level includes determining a current noise level based on the difference between the sampled signal and the smoothed signal, and determining a long-term average noise level based on an exponentially weighted moving average of the current noise level and previously determined noise levels.

4. The method of claim 1 wherein the step of determining a tune noise band includes determining a long term average noise level, and wherein the tune noise band is determined based upon the long-term average noise level and the current setpoint value.

5. An HVAC a proportional gain and integral time controller having dynamically adjusted control parameters disposed to control the position of an actuator in an HVAC system, comprising:

means for sampling a feedback signal representative of a temperature of output air of the HVAC system to generate a sampled signal;

means for generating a smoothed signal based on the sampled signal;

means for determining an estimated noise level of the sampled signal;

means for determining a tune noise band based on the estimated noise level and the smoothed signal;

means for adjusting the gain and integral time values used by the controller if either the difference between a previous setpoint temperature and a current setpoint temperature, or the difference between the current setpoint temperature and the smoothed signal, falls outside the tune noise band; and means for utilizing the adjusted control parameters to adjust the position of the actuator.

6. The apparatus of claim 5 wherein the means for generating a smoothed signal includes means for determining a smoothed sample value based upon fitting a quadratic function through a first plurality of evenly spaced points, and means for estimating the slope of the sampled signal based upon fitting a quadratic function through a second plurality of evenly spaced points.

7. The apparatus of claim 5 wherein the means for determining an estimated noise level includes means for determining a current noise level based on the difference between the sampled signal and the smoothed signal, and means for determining a long-term average noise level based on an exponentially weighted moving average of the current noise level and previously determined noise levels.

8. The apparatus of claim 5 wherein the means for determining a tune noise band includes means for determining a long-term average noise level and the current setpoint value.

9. A method of dynamically adjusting the control parameters of a proportional gain and integral time controller disposed to control an actuator in an HVAC system, comprising the steps of:

sampling a feedback signal representative of the temperature of air output by the HVAC system to generate a sampled signal;

generating a smoothed signal based on the sampled signal;

determining an estimated noise level of the sampled signal;

determining a tune noise band based on the estimated noise level and the smoothed signal;

determining whether a significant setpoint temperature change has occurred by comparing the tune noise band to the difference between a previous setpoint temperature and a current setpoint temperature;

determining whether a significant load disturbance has occurred by comparing the tune noise band to the difference between the current setpoint temperature and the smoothed signal;

determining a damping factor based on the slope of the smoothed signal;

determining a closed loop response time based on the height of the smoothed signal;

determining an average disturbance size;

estimating an optimal gain based on the damping factor;

estimating an optimal integral time based on the response time;

determining a new gain and a new integral time based on the estimated optimal gain, the estimated optimal integral time, the current gain and integral time values used in the controller, a signal-to-noise ratio of the sampled signal, and the size of a current load disturbance or setpoint temperature change relative to the average disturbance size;

setting the gain and integral time of the controller to the new gain and the new integral time; and utilizing the adjusted control parameters to control the position of the actuator.

10. The method of claim 9 further comprising the step of determining whether the actuator is fully opened or fully closed.

11. The method of claim 9 wherein the step of generating a smoothed signal includes determining a smoothed sample value based upon fitting a quadratic function through a first plurality of evenly spaced points, and estimating the slope of the sampled signal based upon fitting a quadratic function through a second plurality of evenly spaced points.

12. The method of claim 9 wherein the step of determining an estimated noise level includes determining a current noise level based on the difference between the sampled signal and the smoothed signal, and determining a long-term average noise level based on an exponentially weighted moving average of the current noise level and previously determined noise levels.

13. The method of claim 12 wherein the tune noise band is determined based upon the long-term average noise level and the current setpoint value.

14. The method of claim 9 wherein the damping factor is determined, when the smoothed signal is underdamped, according to the formula:

$$d_{slope} = \frac{s_2}{s_1}$$

where, for setpoint changes, S is the maximum of the absolute value of the slope of the smoothed signal between the time the smoothed signal falls outside a tune noise range and the time of a first extremum, and $S_2$ is the maximum of the absolute value of the slope of the smoothed signal between the time of the first extremum and a second extremum, and for load disturbances, $S_1$ is the maximum of the absolute value of the slope of the smoothed signal between the time of the first extremum and the second extremum, and $S_2$ is the maximum of the absolute value of the slope of the smoothed signal between the time of the second extremum and a third extremum.

15. The method of claim 9 wherein the closed loop response time is determined, when the smoothed signal is underdamped, according to the formula:

$$\theta = \frac{h}{s_1 T}$$

where $\theta$ is the closed loop response time, T is the sampling interval, h is the height of the response, and for setpoint temperature changes, $S_1$ is the maximum of the absolute value of the slope of the smoothed signal between the time the smoothed signal falls outside a tune noise range and the time of a first extremum, and for load disturbances, $S_1$ is the maximum of the absolute value of the slope of the smoothed signal between the time of the first extremum and a second extremum.

16. The method of claim 9 wherein the average disturbance size is determined by calculating an exponentially weighted moving average of the difference between the previous setpoint temperature and a first extremum.

17. The method of claim 9 wherein the step of estimating an optimal gain based on the damping factor includes determining the ratio of the estimated optimal gain to the present gain is according to the formula:

$$\frac{\hat{K}_{opt}}{K} = a_0 + a_1 d_{slope} + a_2 d_{slope}^2 \ldots + a_n d_{slope}^n$$

where $\hat{K}_{i,opt}$ is the estimated optimal gain, K is the present value of the gain used in the controller $D_{slope}$, and the $A_n$ coefficients are determined by linear regression.

18. The method of claim 9 wherein the step of estimating an optimal integral time based on the response time includes determining the ratio of the estimated optimal integral time to the actual sampling interval according to the formula:

$$\frac{\hat{T}_{i,opt}}{T} = b_0 + b_1 \theta + b_2 \theta^2 \ldots + b_n \theta^n$$

where $\hat{T}_{i,opt}$ is the estimated optimal integral time T is the sampling interval, $\theta$ is the closed loop response time, and the $B_n$ coefficients are determined by linear regression.

19. A proportional gain and integral time controller having dynamically adjusted control parameters disposed to control the position of an actuator that determines output air temperature of an HVAC system, comprising:

means for sensing the variable and generating a feedback signal representative of the output air temperature;

means for determining a damping factor based on the slope of the feedback signal;

means for determining a closed loop response time based on the height of the feedback signal;

means for estimating an optimal gain based on the damping factor;

means for estimating an optimal integral time based on the response time;

means for determining a new gain and a new integral time based on the estimated optimal gain, the estimated optimal integral time, and the current gain and integral time values used in the controller;

means for setting the gain and integral time of the controller to the new gain and the new integral time; and utilizing the adjusted control parameters to control the position of the actuator.

20. The apparatus of claim 19 further comprising:

means for sampling the feedback signal; and means for smoothing the feedback signal based on the sampled values.

21. The apparatus of claim 19 further comprising:

means for determining an estimated noise level of the feedback signal;

means for determining a tune noise band based on the estimated noise level and the feedback signal;

means for determining whether a significant setpoint temperature change has occurred by comparing the tune noise band to the difference between a previous setpoint temperature and a current setpoint temperature;

means for determining whether a significant load disturbance has occurred by comparing the tune noise band to the difference between the current setpoint temperature and the feedback signal; and wherein the gain and integral time of the controller are set to the new gain and the new integral time when either a significant setpoint temperature change or a significant load disturbance occurs.

22. The apparatus of claim 21 further comprising means for determining an average disturbance size, wherein the new gain and new integral time are further based upon a signal-to-noise ratio of the feedback signal and the size of a current load disturbance or setpoint change relative to the average disturbance size.

\* \* \* \* \*